United States Patent
Goto et al.

(10) Patent No.: US 10,875,107 B2
(45) Date of Patent: Dec. 29, 2020

(54) CIRCULAR SAW MACHINE CAPABLE OF SUPPRESSING RUNOUT OF CIRCULAR SAW BLADE

(71) Applicants: AMADA HOLDINGS CO., LTD., Kanagawa (JP); AMADA MACHINE TOOLS CO., LTD., Kanagawa (JP)

(72) Inventors: Minoru Goto, Kanagawa (JP); Tomoyuki Shiga, Kanagawa (JP); Yuichi Okamoto, Kanagawa (JP)

(73) Assignees: AMADA HOLDINGS CO., LTD., Kanagawa (JP); AMADA MACHINE TOOLS CO., LTD., Kanagawa (JP)

( * ) Notice: Subject to any disclaimer, the term of this patent is extended or adjusted under 35 U.S.C. 154(b) by 0 days.

(21) Appl. No.: 16/060,613

(22) PCT Filed: Nov. 30, 2016

(86) PCT No.: PCT/JP2016/085549
§ 371 (c)(1),
(2) Date: Jun. 8, 2018

(87) PCT Pub. No.: WO2017/098979
PCT Pub. Date: Jun. 15, 2017

(65) Prior Publication Data
US 2018/0369938 A1    Dec. 27, 2018

(30) Foreign Application Priority Data

Dec. 9, 2015 (JP) .................... 2015-239901

(51) Int. Cl.
*B23D 47/00* (2006.01)
*B23D 45/02* (2006.01)
(Continued)

(52) U.S. Cl.
CPC ............. *B23D 45/02* (2013.01); *B23D 47/00* (2013.01); *B23D 47/005* (2013.01); *B23D 47/08* (2013.01);
(Continued)

(58) Field of Classification Search
CPC ........ B26D 1/085; B23D 45/02; B23D 47/00; B23D 47/08; B27B 5/30; B23Q 9/0014
(Continued)

(56) References Cited

U.S. PATENT DOCUMENTS 2,589,309 A    3/1952    Tompkins
2,941,451 A    6/1960    Hanson et al.
(Continued)

FOREIGN PATENT DOCUMENTS

CN    103501943    1/2014
EP    0 016 688    10/1980
(Continued)

OTHER PUBLICATIONS

International Search Report issued in International Bureau of WIPO Patent Application No. PCT/JP2016/085549, dated Feb. 21, 2017, and English lanugage translation thereof.
(Continued)

*Primary Examiner* — Kenneth E Peterson
*Assistant Examiner* — Nhat Chieu Q Do
(74) *Attorney, Agent, or Firm* — Greenblum & Bernstein, P.L.C.

(57) ABSTRACT

A circular saw machine capable of suppressing a cutting-bending of a circular saw blade during cutting, and improving processing accuracy for a cutting surface of a workpiece, regardless of a size of a width of the workpiece. A circular saw machine has: a processing head capable of moving in a cutting direction and its opposite direction and having a circular saw blade capable of rotating; and a movable saw
(Continued)

blade guide set provided to be movable in the cutting direction and the opposite direction on the processing head, for guiding to pinch a body part of the circular saw blade on a diameter direction inner side of a cutting region in the circular saw blade. The movable saw blade guide set is configured to move relatively with respect to the processing head in the opposite direction, in coordination with a movement in the cutting direction of said processing head.

4 Claims, 9 Drawing Sheets

(51) Int. Cl.
*B23D 47/08* (2006.01)
*B27B 5/30* (2006.01)
*B23D 47/02* (2006.01)

(52) U.S. Cl.
CPC .............. *B27B 5/30* (2013.01); *B23D 45/021* (2013.01); *B23D 47/025* (2013.01)

(58) Field of Classification Search
USPC ......... 83/468.4, 698.21, 928, 478, 544, 397, 83/860, 471.3; 451/154; 30/377, 292
See application file for complete search history.

(56) References Cited

U.S. PATENT DOCUMENTS

| | | | | | |
|---|---|---|---|---|---|
| 2,973,576 | A | * | 3/1961 | Hentke | ................ B23D 45/16 30/371 |
| 3,812,752 | A | | 5/1974 | Jaegers | |
| 4,164,883 | A | | 8/1979 | Jagers | |
| 4,247,148 | A | * | 1/1981 | Eriksson | ............... E01C 23/092 299/40.1 |
| 4,290,330 | A | | 9/1981 | Washio et al. | |
| 4,545,121 | A | * | 10/1985 | Armbruster | ........ B23D 57/0076 144/136.1 |
| 5,142,825 | A | * | 9/1992 | Floyd | .................. B23D 45/006 30/102 |
| 2003/0041717 | A1 | * | 3/2003 | Evenson | ................ B23D 45/16 83/663 |
| 2013/0276602 | A1 | | 10/2013 | Washio | |

FOREIGN PATENT DOCUMENTS

| | | | | |
|---|---|---|---|---|
| EP | 2737968 | A1 | * 6/2014 | .......... B23D 47/005 |
| JP | 2-239901 | | 9/1990 | |
| JP | 4-16302 | | 1/1992 | |
| JP | 7-227714 | | 8/1995 | |
| JP | 9-85527 | | 3/1997 | |
| JP | 2013-215877 | | 10/2013 | |
| WO | 2013/015042 | | 2/2013 | |

OTHER PUBLICATIONS

Written Opinion issued in International Bureau of WIPO Patent Application No. PCT/JP2016/085549, dated Feb. 21, 2017, and English lanugage translation thereof.
Notification of Reasons for Refusal in JP Counter Part Patent Application No. 2015-239901, dated Feb. 8, 2017, along with an english translation thereof.
Decision to Grant a Patent in JP Counter Part Patent Application No. 2015-239901, dated Mar. 27, 2017, along with an english translation thereof.
Office Action issued in CN Counterpart Patent Appl. No. 201680071805.2, dated Jan. 14, 2019.
Official Action issued in counterpart Taiwan Patent Application No. 10620901450 dated Aug. 31, 2017.
Official Communication issued in European Patent Office (EPO) Patent Application No. 16872878.0, dated Jul. 19, 2019.

* cited by examiner

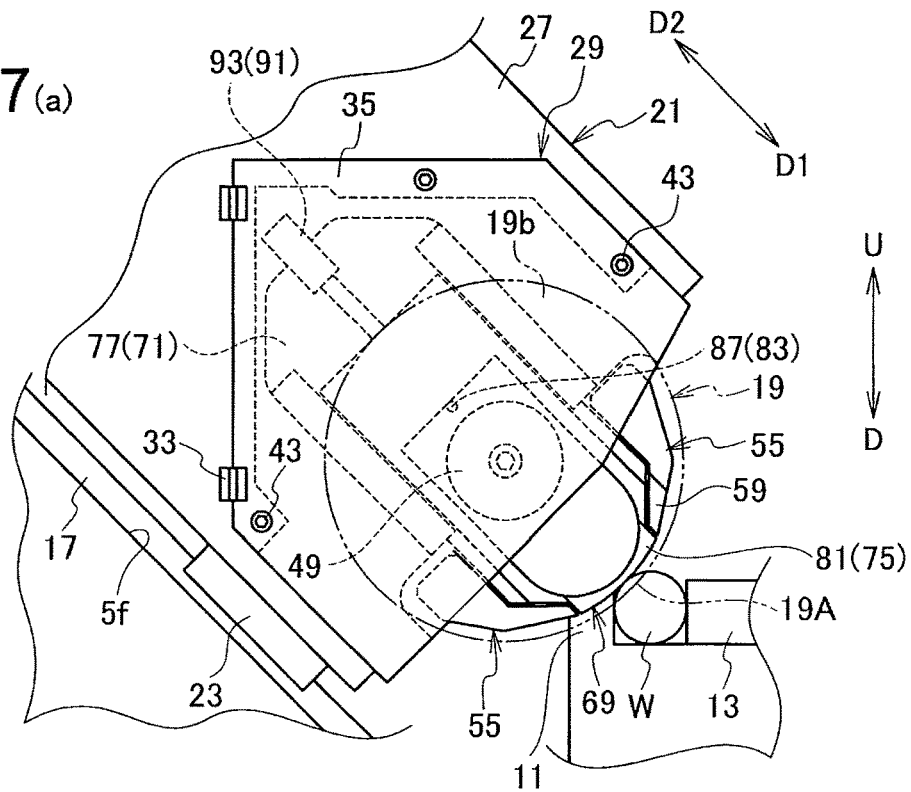
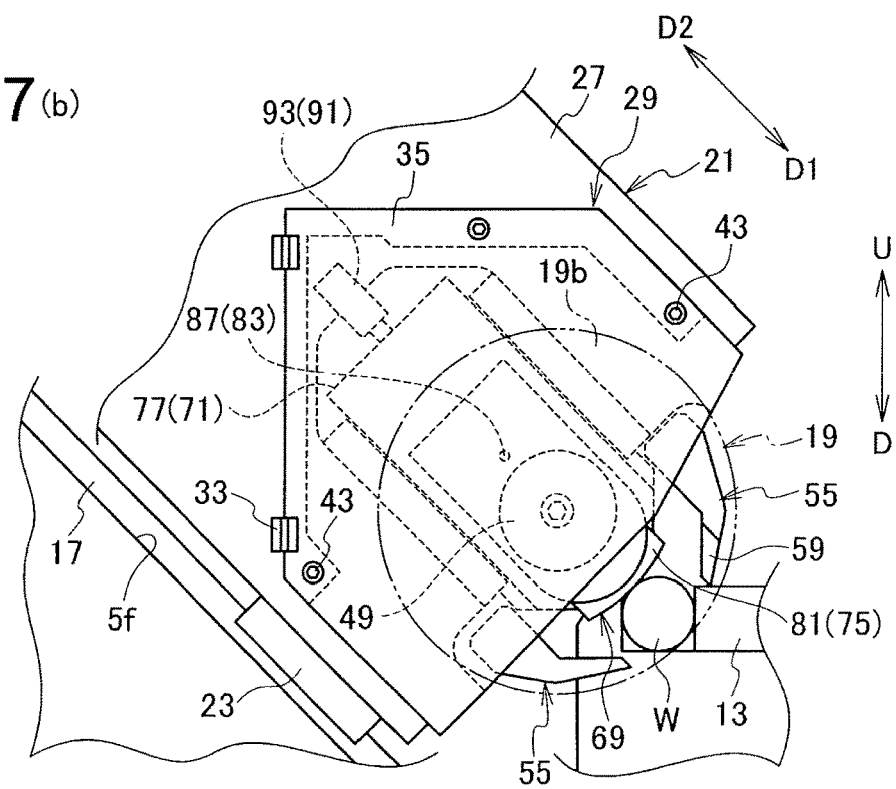

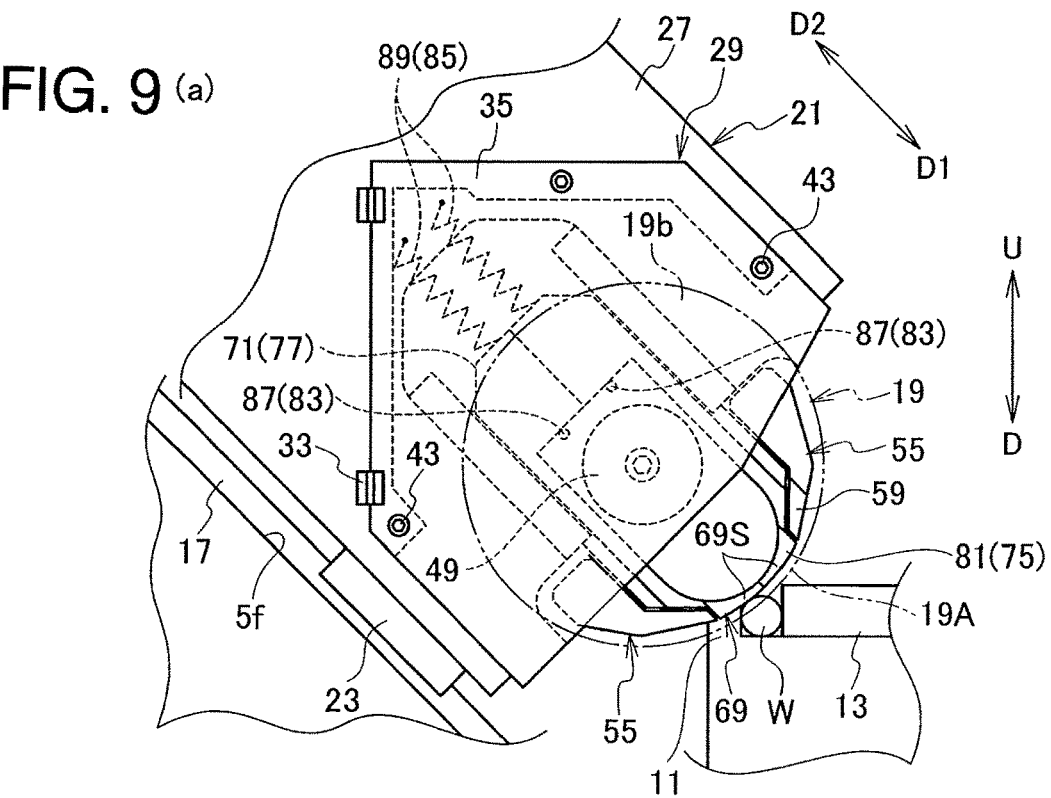
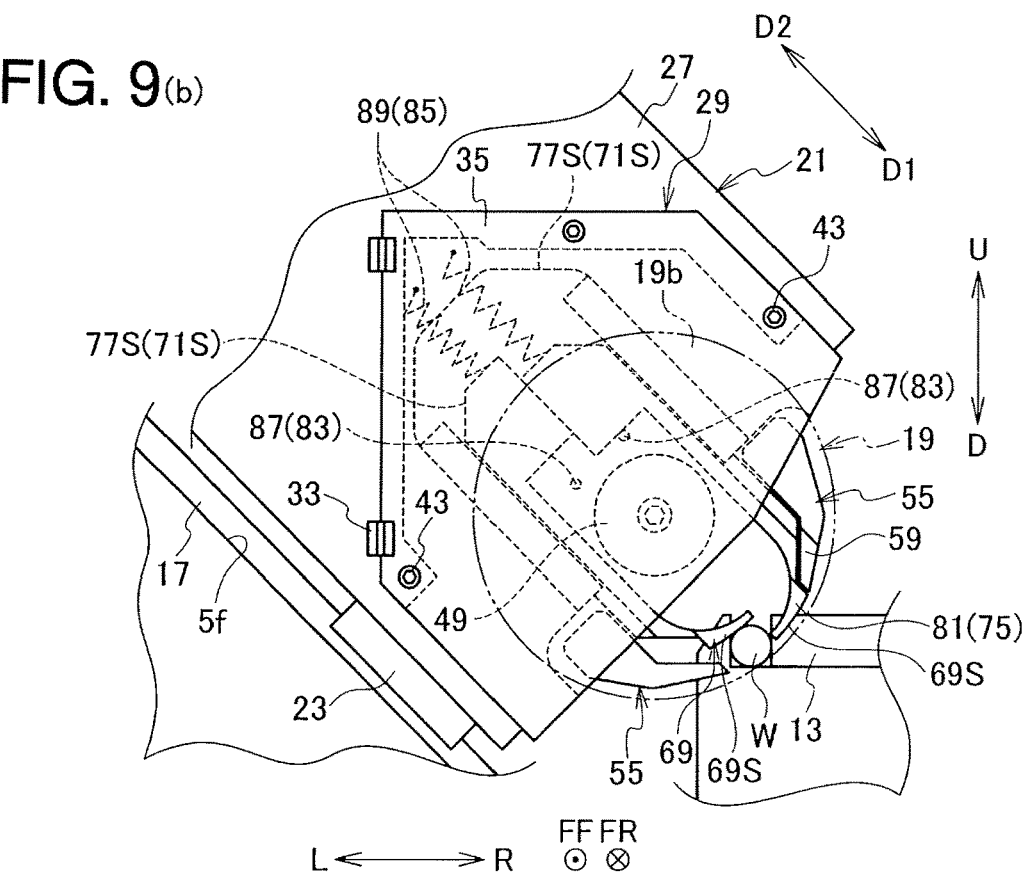

CIRCULAR SAW MACHINE CAPABLE OF SUPPRESSING RUNOUT OF CIRCULAR SAW BLADE

TECHNICAL FIELD

The present invention relates to a circular saw machine for carrying out a cutting processing with respect to a portion to be cut of a workpiece.

BACKGROUND TECHNIQUE

In recent years, a variety of a circular saw machine has been developed. When a general configuration of a conventional circular saw machine is to be explained briefly, it is as follows (see Patent Document 1 and the like).

The conventional circular saw machine has a processing head having a circular saw blade capable of rotating, and this processing head is made to be capable of moving in a cutting direction for imparting a cut to a workpiece and its opposite direction. A region positioned on a cutting direction side in the circular saw blade is made to be a cutting region in which a cutting effect is effectuated. Also, the processing head is equipped with a pair of fixed saw blade guide sets for guiding to pinch a body part of the circular saw blade on both sides of the cutting region in the circular saw blade. The pair of fixed saw blade guide sets are separated in a direction orthogonal to the cutting direction, and usually, an interval in said orthogonal direction of the pair of fixed saw blade guide sets is set to be an interval in accordance with a largest width (a maximum width) of a workpiece to be a cutting target.

Patent Document 1: Japanese Patent Application Publication No. H9-85527

In the conventional circular saw machine, the interval in said orthogonal direction of the pair of fixed saw blade guide sets is set as described above, and in the case of carrying out the cutting processing with respect to a portion to be cut of a workpiece with a small width, a distance between the fixed saw blade guide sets and a portion to be cut of the workpiece becomes large, so that a rigidity of the cutting region in the circular saw blade cannot be secured sufficiently. For this reason, a cutting-bending of the circular saw blade is easy to occur during the cutting processing, and there are cases where a lowering of a processing accuracy (surface accuracy) for a cutting surface of the workpiece is caused.

In other words, the conventional circular saw machine has a problem in that it is difficult to suppress a cutting-bending of the circular saw blade during the cutting processing, and improve a processing accuracy for a cutting surface of the workpiece, regardless of a size of a width of the workpiece.

SUMMARY OF THE INVENTION

The present invention has an object of providing a circular saw machine comprised of a new configuration, which can resolve the problem described above.

According to one aspect of the present invention, there is provided a circular saw machine, comprising: a processing head capable of moving in a cutting direction for imparting a cut to a workpiece and its opposite direction, and having a circular saw blade capable of rotating; and a movable saw blade guide set provided to be movable in said cutting direction and said opposite direction (a diameter direction of said circular saw blade) on said processing head, for guiding to pinch a body part of said circular saw blade on a diameter direction inner side (a diameter direction inner side of said circular saw blade) of a cutting region in which a cutting effect in said circular saw blade is effectuated, said movable saw blade guide set being configured to move relatively with respect to said processing head in said opposite direction, in coordination with a movement in said cutting direction of said processing head, as a cutting into the workpiece progresses.

Also, preferably, said circular saw machine is further comprising a pair of fixed saw blade guide sets provided to be separated in a direction orthogonal to said cutting direction on said processing head, for guiding to pinch the body part of said circular saw blade on both sides (both sides of said orthogonal direction) of said cutting region.

Also, preferably, said circular saw machine is further comprising: a stopper for regulating a movement in said cutting direction of said movable saw blade guide set with respect to said processing head; and a biasing member for biasing said movable saw blade guide set into said cutting direction.

Also, preferably, said circular saw machine is further comprising an actuator for moving said movable saw blade guide set relatively with respect to said processing head in said cutting direction and said opposite direction.

Also, preferably, said circular saw machine is such that said movable saw blade guide set is divided in a direction orthogonal to said cutting direction.

Also, preferably, in said circular saw machine, said processing head has a saw blade casing for housing said circular saw blade; said saw blade casing has a casing body, and a casing rid provided on said casing body and capable of opening or closing a front side of said casing body; and said movable saw blade guide set has: a first movable insert provided to be movable in said cutting direction and said opposite direction on an inner surface of said casing body and being capable of contacting a back surface of the body part of said circular saw blade; and a second movable insert provided to be movable in said cutting direction and said opposite direction on an inner surface of said casing rid and being capable of contacting a front surface of the body part of said circular saw blade.

According to one embodiment of the present invention, said processing head is moved in said cutting direction, in a state where said circular saw blade is rotated. Then, it is possible to impart a cut to the workpiece by said circular saw blade, and carry out a cutting processing with respect to a portion to be cut of the workpiece.

Here, until a start of a cutting into the workpiece (immediately after a start of the cutting), said movable saw blade guide set guides to pinch a body part of said circular saw blade on a diameter direction inner side of said cutting region in said circular saw blade. By this, it is possible to suppress a runout of said circular saw blade when said circular saw blade is plunging into the workpiece (when the cutting into the workpiece is started), regardless of a size of a width of the workpiece.

Also, as the cutting into the workpiece progresses, said movable saw blade guide set moves relatively with respect to said processing head in said opposite direction, in coordination with a movement in said cutting direction of said processing head. By this, said movable saw blade guide set will not be an obstacle in the cutting processing of the workpiece.

According to the present invention, as mentioned above, it is possible to suppress a runout of said circular saw blade when said circular saw blade is plunging into the workpiece, regardless of a size of a width of the workpiece. Thus, according to the present invention, it is possible to suppress a cutting-bending of said circular saw blade during the cutting processing, and improve a processing accuracy for a cutting surface of the workpiece, regardless of a size of a width of the workpiece.

BRIEF DESCRIPTION OF THE DRAWINGS

FIGS. 7(a) and 7(b) are diagrams for explaining an operation of a movable saw blade guide set and the like according to a first modified example of an embodiment of the present invention.

FIGS. 9(a) and 9(b) are diagrams for explaining an operation of a movable saw blade guide set and the like according to a second modified example of an embodiment of the present invention.

EMBODIMENTS FOR IMPLEMENTING THE INVENTION

The embodiments (including the first modified example and the second modified example) of the present invention will be described with references to the drawings.

Note that, in the specification and claims of the present application, "provided" is meant to include provided indirectly via another element, besides provided directly, and synonym to "equipped". "equipped" is meant to include equipped indirectly via another element, besides equipped directly, and synonym to "provided". "diameter direction" indicates a diameter direction of the circular saw blade, and "diameter direction inner side" indicates an inner side in the diameter direction of the circular saw blade. "cutting position" indicates a position in a conveying direction in which the cutting processing is carried out. In the figures, "FF" indicates a front direction (conveying direction), "FR" indicates a rear direction, "L" indicates a left direction, "R" indicates a right direction, "U" indicates an upward direction, and "D" indicates a downward direction, respectively.

Embodiment

The circular saw machine 1 according to the embodiment of the present invention carries out the cutting processing with respect to a portion to be cut of a rod shaped workpiece W which is positioned to a cutting position in the conveying direction (front direction). Then, a configuration of the circular saw machine 1 according to the embodiment of the present invention is as follows.

Figure 1:
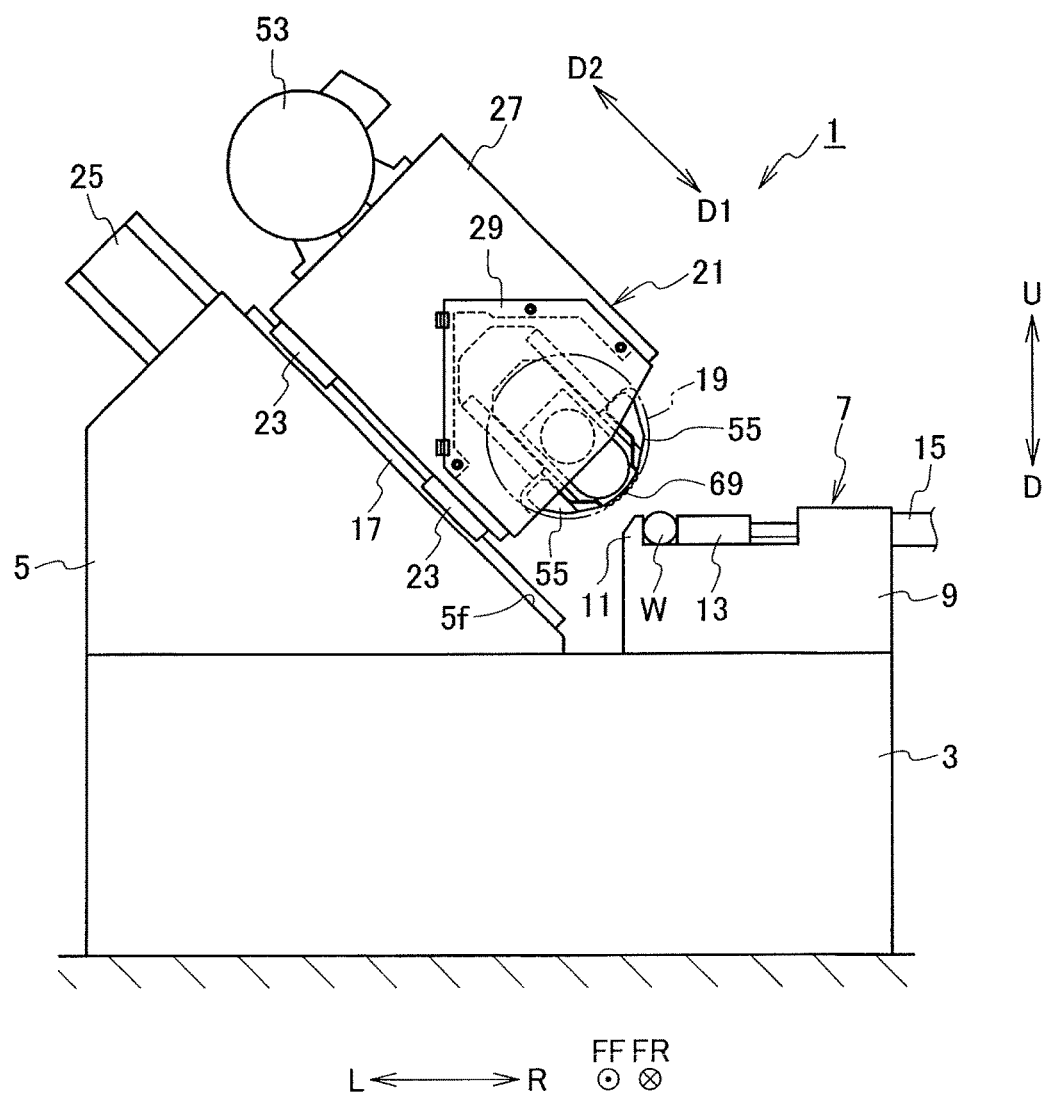
FIG. 1 is a schematic front view of a circular saw machine according to an embodiment of the present invention.
Figure 2:
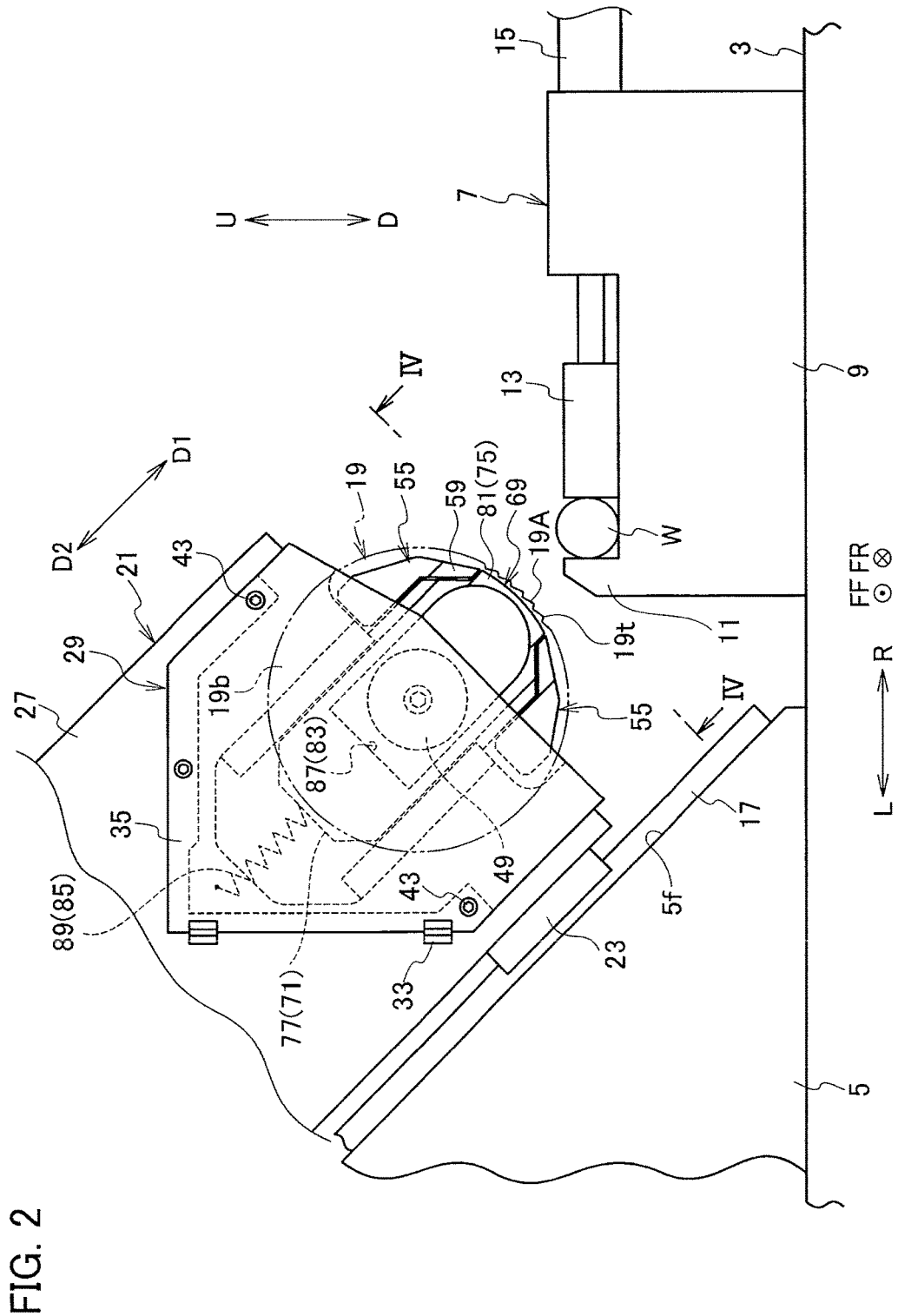
FIG. 2 is an enlarged view of a main portion of a circular saw machine according to an embodiment of the present invention.

As shown in FIG. 1 and FIG. 2, the circular saw machine 1 is equipped with a base mount (bed) 3 extended in a conveying width direction (left and right direction) orthogonal to the conveying direction, and a support frame 5 provided on a left portion of an upper surface of this base mount 3. The support frame 3 has an inclined surface 5f that is inclined with respect to a horizontal direction (left and right direction).

The base mount 3 is equipped with a main body vice 7 for fixing the workpiece W with respect to the base mount 3, in an immediately upstream side (immediately upstream side in the conveying direction) of the cutting position in its upper surface (upper surface of the base mount 3). The main body vice 7 has a vice bed (processing table) 9 provided on the upper surface of the base mount 3 and supporting the workpiece W. The vice bed 9 is equipped with a fixed vice jaw 11 on a left portion of its upper surface (upper surface of the vice bed 9). The vice bed 9 is equipped with a movable vice jaw 13 pinching the workpiece W in cooperation with the fixed vice jaw 11, on its upper surface, and this movable vice jaw 13 is made to be movable in the conveying width direction. Then, the vice bed 9 is equipped with a hydraulic cylinder for vice 15 that moves the movable vice jaw 13 in the conveying width direction.

Note that the base mount 3 is equipped with a conveying table (omitted to be shown in the figure) for supporting the workpiece W to be movable in the conveying direction, on its rear side (rear side of the base mount 3). Also, the conveying table is equipped with a conveying vice (omitted to be shown in the figure) for conveying the workpiece W in the conveying direction, at its appropriate position (appropriate position of the conveying table).

The support frame 5 is equipped with a plurality (only one is shown in the figure) of guide rails 17 extended in an inclined direction, on its inclined surface 5f. The plurality of guide rails 17 are equipped with a processing head 21 having a circular saw blade 19 that is capable of rotating, between them (between the plurality of guide rails 17). The circular saw blade 19 has a disk shaped body part 19b, and a plurality (multiplicity) of cutting teeth 19t provided on an outer circumferential surface of this body part 19b. Here, a region positioned on a cutting direction D1 side in the circular saw blade 19 is made to be a cutting region 19A in which the cutting effect is effectuated.

The processing head 21 is equipped with a plurality of members to be guided 23 which are guided in the cutting direction (one side of the inclined direction) D1 and its opposite direction (another side of the inclined direction) D2 to the corresponding guide rails 17, on its lower surface (lower surface of the processing head 21). In other words, the processing head 21 is provided to be movable in the cutting direction D1 and the opposite direction D2 via the plurality of guide rails 17 and the plurality of members to be guided 23, on the inclined surface 5f of the support frame 5.

The support frame 5 is equipped with an electric motor for processing head 25 as an actuator for the processing head that moves the processing head 21 in the cutting direction D1 and its opposite direction D2, on its upper portion. Also, an output shaft (omitted to be shown in the figure) of the electric motor for processing head 25 is coordinated and connected with the processing head 21 via a ball screw (omitted to be shown in the figure) and a nut member (omitted to be shown in the figure). Note that, as the actuator for the processing head, a hydraulic cylinder for processing head (omitted to be shown in the figure) may be used.

Figure 3:
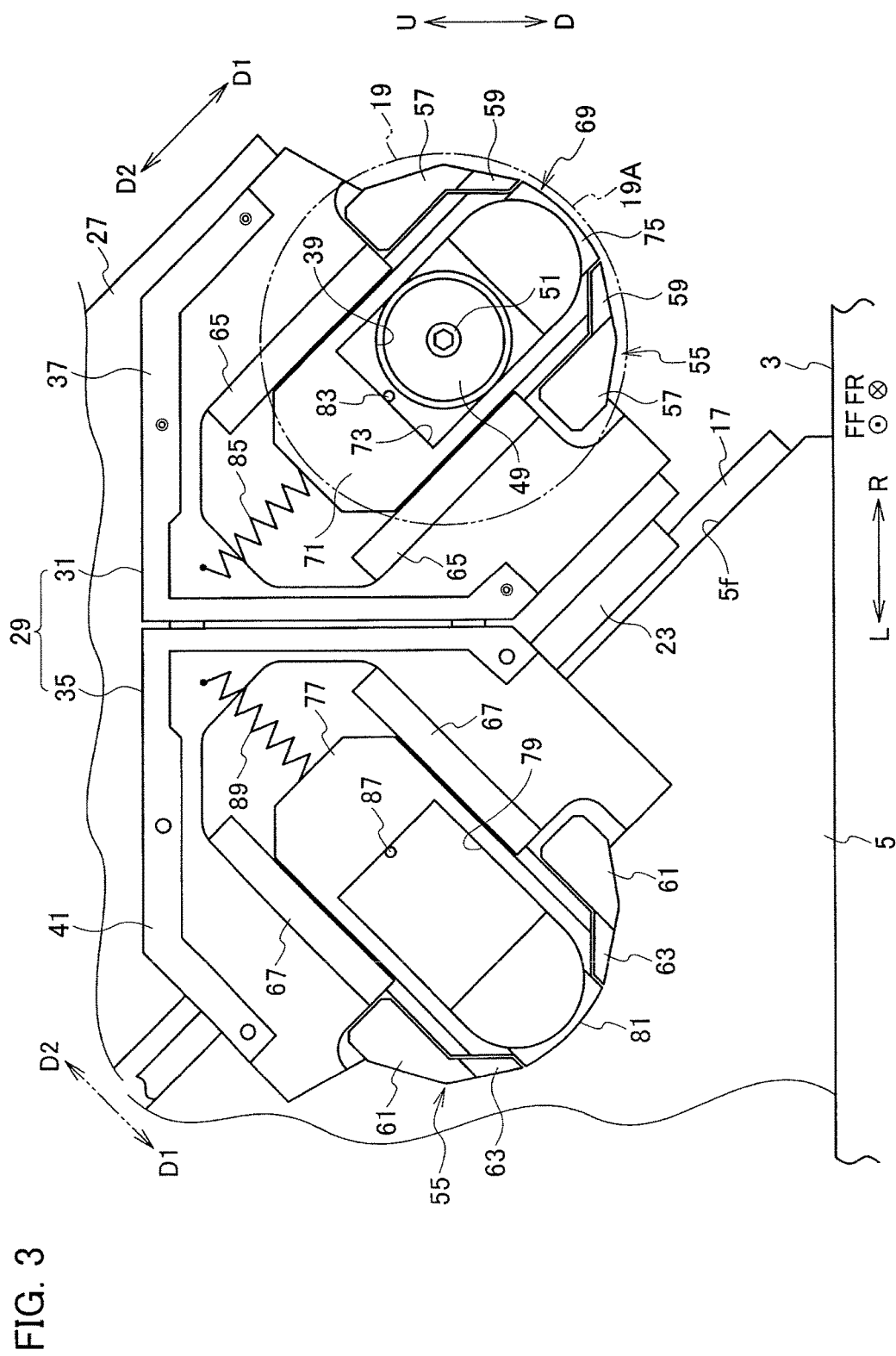
FIG. 3 is a diagram showing a main portion of an embodiment of the present invention, which is showing a state where a front side of a casing body is opened by a casing rid.
Figure 4:
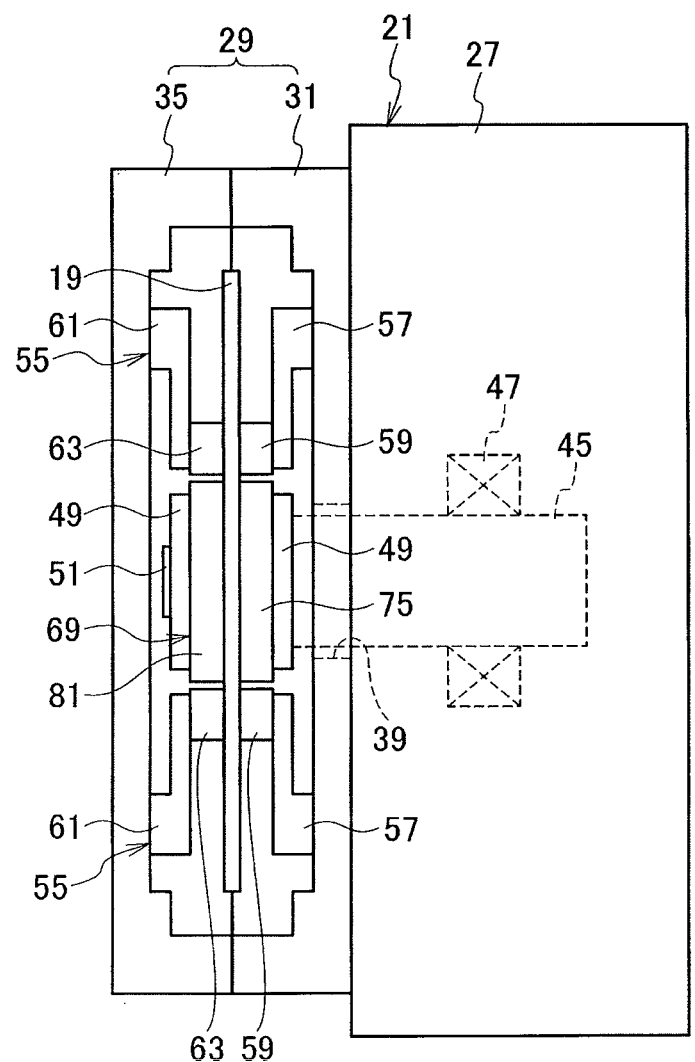
FIG. 4 is an enlarged view along a IV-IV line in FIG. 2.

As shown in FIG. 2 to FIG. 4, the processing head 21 has a movable box 27 provided to be movable in the cutting direction D1 and its opposite direction D2, on the inclined surface 5f of the support frame 5, and a saw blade casing 29 provided on a lower portion of this movable box 27 and housing a part of the circular saw blade 19. Also, the saw blade casing 29 has a casing body 31 provided on a lower portion of the movable box 27, and a casing rid (casing cover) 35 provided on this casing body 31 via a plurality of hinges 33 and capable of opening or closing a front side of the casing body 31. The casing rid 35 is in a shape approximating the casing body 31.

The casing body 31 has a first rib 37 on an upper portion of its inner side surface (inner side surface of the casing body 31), and a front view of a major part of this first rib 37 is in an L-shape. The casing body 31 has an insertion hole 39 on its central portion (central portion of the casing body 31). Also, the casing rid 35 has a second rib 41 on an upper portion of its inner side surface (inner side surface of the casing rid 35), and a front view of a major part of this second rib 41 is in an L-shape. The second rib 41 is made to be integrally joined with the first rib 37 by a plurality of bolts 43. In other words, the casing rid 35 is made to be integrally joined with the casing body 31 by the plurality of bolts 43, in a state where a front side of the casing body 31 is closed.

The movable box 27 is equipped with a main shaft 45 via a bearing 47 and the like, on its interior (interior of the movable box 27), and this main shaft 45 is made to be rotatable around its shaft center (shaft center of the main shaft 45). A tip end portion side of the main shaft 45 is inserted into the insertion hole 39, and on a tip end portion of the main shaft 45, the circular saw blade 19 is fixed by a bolt 51 in a state of being pinched by a pair of attachment flanges (attachment plates) 49.

The movable box 27 is equipped with an electric motor for circular saw blade 53 that rotates the circular saw blade 19, on its upper portion. Also, an output shaft (omitted to be shown in the figure) of the electric motor for circular saw blade 53 is coordinated and connected to the main shaft 45 via a gear mechanism (omitted to be shown in the figure) and a belt mechanism (omitted to be shown in the figure) provided within the movable box.

The saw blade casing 29 is equipped with a pair of fixed saw blade guide sets 55 that guide to pinch the body part 19b of the circular saw blade 19 on both sides of the cutting region 19A in the circular saw blade 19, at its appropriate position (appropriate position of the saw blade casing 29). The pair of fixed saw blade guide sets 55 are separated in a direction orthogonal to the cutting direction D1.

Each fixed saw blade guide set 55 has a first bracket 57 fixed to an inner side surface of the casing body 31, and a first fixed insert 59 provided at a tip end portion of this first bracket 57 and capable of contacting a back surface of the body part 19b of the circular saw blade 19. The first fixed insert 59 is made of a hard material such as carbide, for example. Also, each fixed saw blade guide set 55 has a second bracket 61 fixed to an inner side surface of the casing rid 35, and a second fixed insert 63 provided at a tip end portion of this second bracket 61 and capable of contacting a front surface of the body part 19b of the circular saw blade 19. The second fixed insert 63 is made of a hard material such as carbide, for example.

The casing body 31 is equipped with a pair of first slide guides 65 extended in the cutting direction D1, on its inner side surface (inner side surface of the casing body 31), and a cross section of each first slide guide 65 is in an L-shape. Similarly, the casing rid 35 is equipped with a pair of second slide guides 67 extended in the cutting direction D1, on its inner side surface (inner side surface of the casing rid 35), and a cross section of each second slide guide 67 is in an L-shape.

The saw blade casing 29 is equipped with a movable saw blade guide set 69 that guides to pinch the body part 19b of the circular saw blade 19 in a diameter direction inner side (diameter direction inner side of the circular saw blade 19) of the cutting region 19A in the circular saw blade 19, between the pair of fixed saw blade guide sets 55. The movable saw blade guide set 69 is made to be movable in the cutting direction D1 and the opposite direction D2 via the pair of first slide guides 65 and the pair of second slide guides 67.

The movable saw blade guide set 69 has a first movable plate 71 provided to be movable in the cutting direction D1 and the opposite direction D2 via the pair of first slide guides 65, on an inner side surface of the casing body 31. On the first movable plate 71, a first cutout 73 into which the attachment flange 49 is to be inserted is formed, and the first movable plate 71 is made to be not in contact with the attachment flange 49. Also, the movable saw blade guide set 69 has a first movable insert 75 provided at a tip end portion of the first movable plate 71 and capable of contacting a back surface of the body part 19b of the circular saw blade 19. The first movable insert 75 is made of a hard material such as carbide, for example.

The movable saw blade guide set 69 has a second movable plate 77 provided to be movable in the cutting direction D1 and the opposite direction D2 via the pair of second slide guides 67, on an inner side surface of the casing rid 35. On the second movable plate 77, a second cutout 79 into which the attachment flange 49 is to be inserted is formed, and the second movable plate 77 is made to be not in contact with the attachment flange 49. Also, the movable saw blade guide set 69 has a second movable insert 81 provided at a tip end portion of the second movable plate 77 and capable of contacting a front surface of the body part 19b of the circular saw blade 19. The second movable insert 81 is made of a hard material such as carbide, for example.

The casing body 31 is equipped with a first stopper 83 for regulating a movement in the cutting direction D1 of the first movable plate 71, at an appropriate position on its inner side surface (inner side surface of the casing body 31). Also, the casing body 31 is equipped with a first spring 85 as a first biasing member for biasing the first movable plate 71 in the cutting direction D1 (to the first stopper 83 side), on an upper portion of its inner side surface.

The casing rid 35 is equipped with a second stopper 87 for regulating a movement in the cutting direction D1 of the second movable plate 77, at an appropriate position on its inner side surface (inner side surface of the casing rid 35). Also, the casing rid 35 is equipped with a second spring 89 as a second biasing member for biasing the second movable plate 77 in the cutting direction D1 (to the second stopper 87 side), on an upper portion of its inner side surface.

In other words, the saw blade casing 29 is equipped with the stoppers 83 and 87 for regulating a movement in the cutting direction D1 of the movable saw blade guide set 69, at an appropriate position on its inner side surface (inner side surface of the saw blade casing 29). Also, the saw blade casing 29 is equipped with the springs 85 and 89 as the biasing member for biasing the movable saw blade guide set 69 in the cutting direction D1, on an upper portion of its inner side surface. Note that, instead of having the saw blade casing 29 equipped with the stoppers 83 and 87, a function for regulating a movement in the cutting direction D1 of the movable saw blade guide set 69 may be added to a part of the fixed saw blade guide sets 55 (the first bracket 57 and the second bracket 61).

Figure 5:
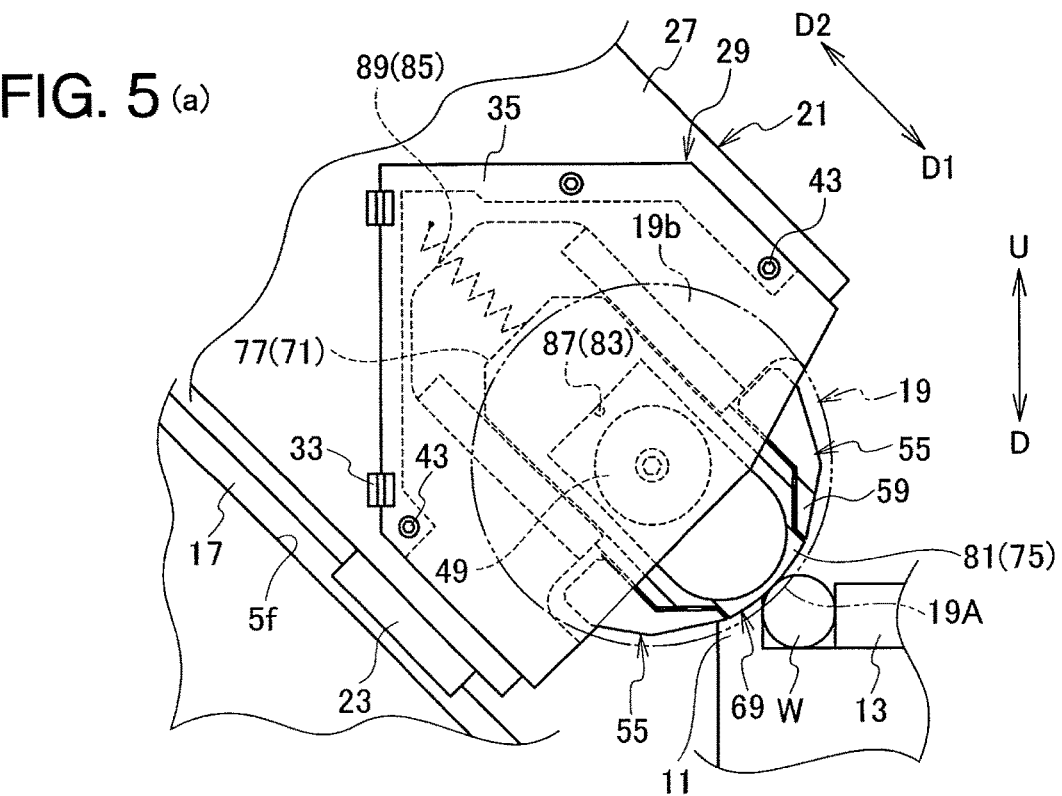
FIGS. 5(a) and 5(b) are diagrams for explaining an operation of a movable saw blade guide set and the like according to an embodiment of the present invention.
Figure 5:
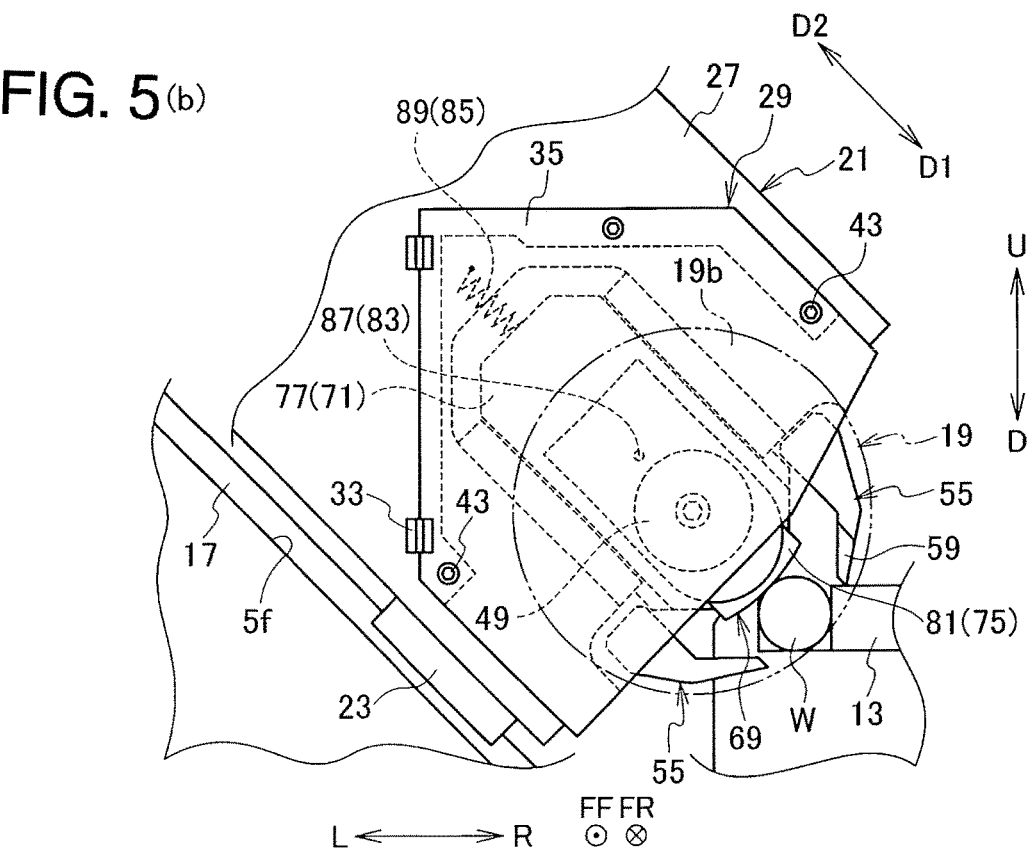

As shown in FIGS. 5(*a*) and (*b*), the movable saw blade guide set 69 is configured to move relatively with respect to the processing head 21 in the opposite direction D2 against a biasing force of the springs 85 and 89, while maintaining a prescribed abutting state, as the cutting into the workpiece W by the circular saw blade 19 progresses. Here, the prescribed abutting state is meant to include a state in which an abutting member (omitted to be shown in the figure) provided on the movable saw blade guide set 69 is abutted to the workpiece W or a fixed portion of the fixed vice jaw 11 and the like, besides a state in which the first movable insert 75 and the second movable insert 81 are abutted to the workpiece W.

Note that it may be configured such that, when the front side of the casing body 31 is closed by the casing rid 35, the second movable plate 77 is integrally connected to the first movable plate 71 by a connection pin (omitted to be shown in the figure) and the like. In this case, either one spring among the first spring 85 and the second spring 89 may be omitted.

Next, the operation and the effect of the embodiment of the present invention will be described.

After the workpiece W is conveyed to the conveying table, the workpiece W is conveyed in the conveying direction by the conveying vice, and the portion to be cut of the workpiece W is positioned at the cutting position. Then, by moving the movable vice jaw 13 to the left direction by the driving of the cylinder for vice 15, the workpiece W is pinched by the cooperation of the fixed vice jaw 11 and the movable vice jaw 13. By this, it is possible to fix the workpiece W with respect to the base mount 3.

After fixing the workpiece W with respect to the base mount 3, the circular saw blade 19 is rotated via the gear mechanism and the belt mechanism by the driving of the electric motor for saw blade 53. Then, the processing head 21 is moved in the cutting direction D1 by the driving of the electric motor for processing head 25. By this, it is possible to carry out the cutting processing with respect to the portion to be cut of the workpiece W, and take out a product (omitted to be shown in the figure) from the workpiece W. During the cutting processing, the pair of fixed saw blade guide sets 55 will guide to pinch the body part 19*b* of the circular saw blade 19 on both sides of the cutting region 19A in the circular saw blade 19.

Here, as shown in FIG. 5(*a*), until a start of the cutting into the workpiece W by the circular saw blade 19 (immediately after a start of the cutting), the movable saw blade guide set 69 guides to pinch the body part 19*b* of the circular saw blade 19 on a diameter direction inner side of the cutting region 19A in the circular saw blade 19. By this, it is possible to suppress a runout of the circular saw blade 19 when the circular saw blade 19 is plunging into the workpiece W (when the cutting into the workpiece W is started), regardless of a size of a width of the workpiece W.

As shown in FIG. 5(*b*), as the cutting into the workpiece by the circular saw blade 19 progresses, the movable saw blade guide set 69 moves relatively with respect to the processing head 21 in the opposite direction D2 against the biasing force of the springs 85 and 89, while maintaining the prescribed abutting state. By this, the movable saw blade guide set 69 will not be an obstacle in the cutting processing.

After the cutting processing, the processing head 21 is moved in the opposite direction D2 by the driving of the electric motor for processing head 25. Then, the processing head 21 breaks away from the workpiece W, while the movable saw blade guide set 69 moves relatively with respect to the processing head 21 in the cutting direction D1 by the biasing force and the like of the springs 85 and 89. By this, the processing head 21 and the movable saw blade guide set 69 can be returned to a state before the cutting processing.

By repeating the above described operation, it is possible to carry out the cutting processing with respect to a plurality of portions to be cut of the workpiece W and take out a plurality of products from the workpiece W.

As described above, according to the present invention, it is possible to suppress a runout of the circular saw blade 19 when the circular saw blade 19 is plunging into the workpiece W, regardless of a size of a width of the workpiece W. Thus, according to the present invention, it is possible to suppress a cutting-bending of the circular saw blade 19 during the cutting processing, and improve a processing accuracy for a cutting surface of the workpiece W, regardless of a size of a width of the workpiece W.

First Modified Example of the Embodiment

Figure 6:
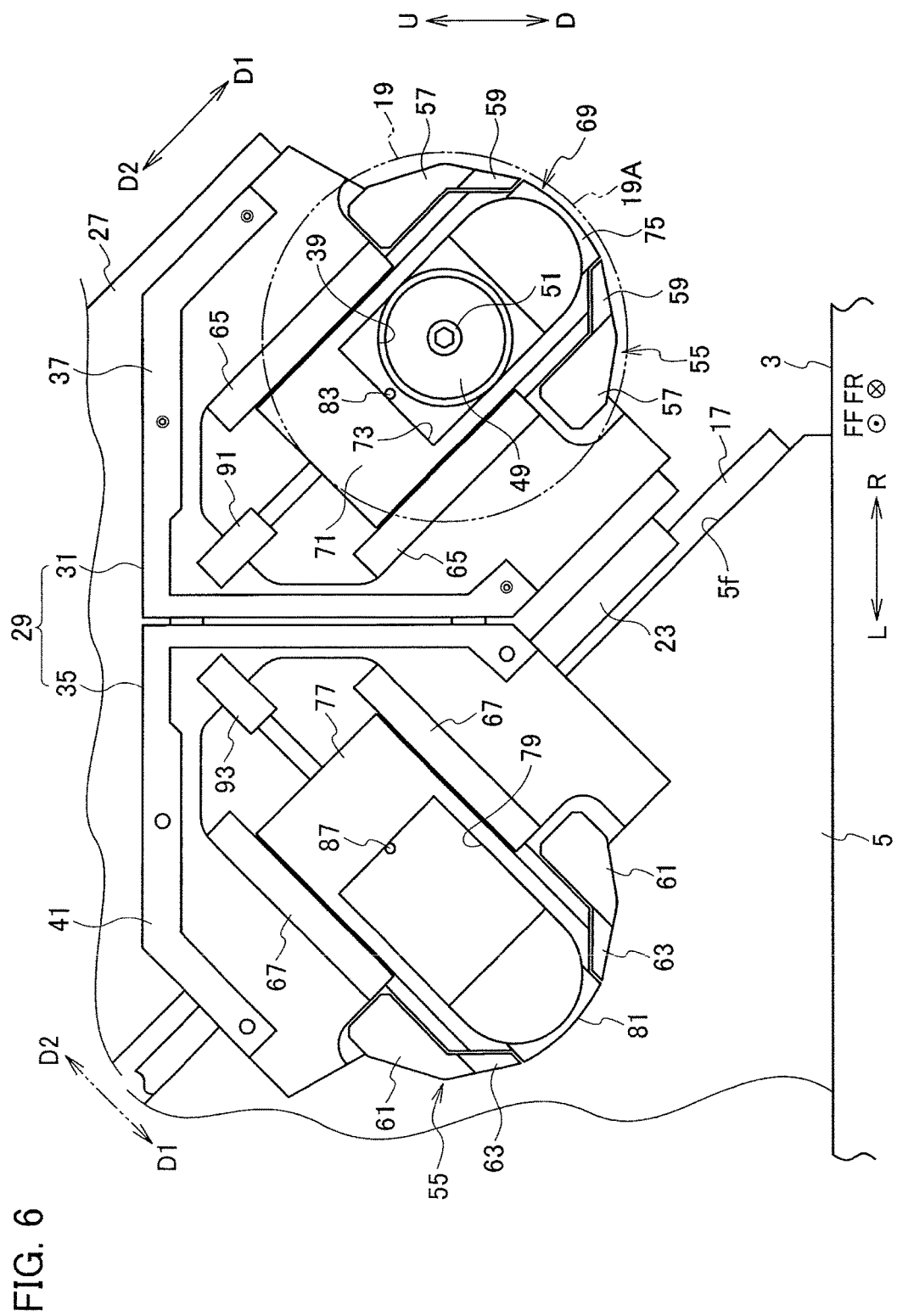
FIG. 6 is a diagram showing a main portion of a first modified example of an embodiment of the present invention, which is showing a state where a front side of a casing body is opened by a casing rid.

As shown in FIG. 6 and FIG. 7(*a*), in the first modified example of the embodiment of the present invention, the springs 85 and 89 provided on an upper portion of an inner side surface of the saw blade casing 29 are omitted. Then, the casing body 31 is equipped with a cylinder for first movable plate 91 as an actuator for the first movable plate that moves the first movable plate 71 relatively with respect to the processing head 21 in the cutting direction D1 and the opposite direction D2, on an upper portion of its inner side surface. Also, the casing rid 35 is equipped with a cylinder for second movable plate 93 as an actuator for the second movable plate that moves the second movable plate 77 relatively with respect to the processing head 21 in the cutting direction D1 and the opposite direction D2, on an upper portion of its inner side surface.

In other words, the saw blade casing 29 is equipped with the cylinder for first movable plate 91 and the cylinder for second movable plate 93, on an upper portion of its inner side surface, instead of the springs 85 and 89. Note that an electric motor for first movable plate (omitted to be shown in the figure) and an electric motor for second movable plate (omitted to be shown in the figure) may be used as the actuator for the first movable plate and the actuator for the second movable plate.

As shown in FIG. 7(*a*), in the first modified example of the embodiment of the present invention, until a start of the cutting into the workpiece W by the circular saw blade 19, the movable saw blade guide set 69 guides to pinch the body part 19*b* of the circular saw blade 19 on a diameter direction inner side of the cutting region 19A in the circular saw blade 19. By this, it is possible to suppress a runout of the circular saw blade 19 when the circular saw blade 19 is plunging into the workpiece W, regardless of a size of a width of the workpiece W.

As shown in FIG. 7(*b*), immediately after the start of the cutting into the workpiece W by the circular saw blade 19, the movable saw blade guide set 69 (the first movable plate 71 and the second movable plate 77) is moved relatively with respect to the processing head 21 in the opposite direction D2 by the driving of the cylinder for first movable plate 91 and the cylinder for second movable plate 93. By this, the first movable insert 75 and the second movable insert 81 will not be abutted to the workpiece W. Also, the movable saw blade guide set 69 will not be an obstacle in the cutting processing.

After the cutting processing, the movable saw blade guide set 69 (the first movable plate 71 and the second movable plate 77) is moved relatively with respect to the processing head 21 in the cutting direction D1 by the driving of the cylinder for first movable plate 91 and the cylinder for second movable plate 93. By this, the movable saw blade guide set 69 can be returned to a state before the cutting processing.

Note that, in the case where it is configured such that, when the front side of the casing body 31 is closed by the casing rid 35, the second movable plate 77 is integrally connected to the first movable plate 71, either one cylinder among the cylinder for first movable plate 91 and the cylinder for second movable plate 93 may be omitted.

Then, in the first modified example of the embodiment of the present invention, the effect similar to the effect of the embodiment of the present invention as described above is effectuated.

Second Modified Example of the Embodiment

Figure 8:
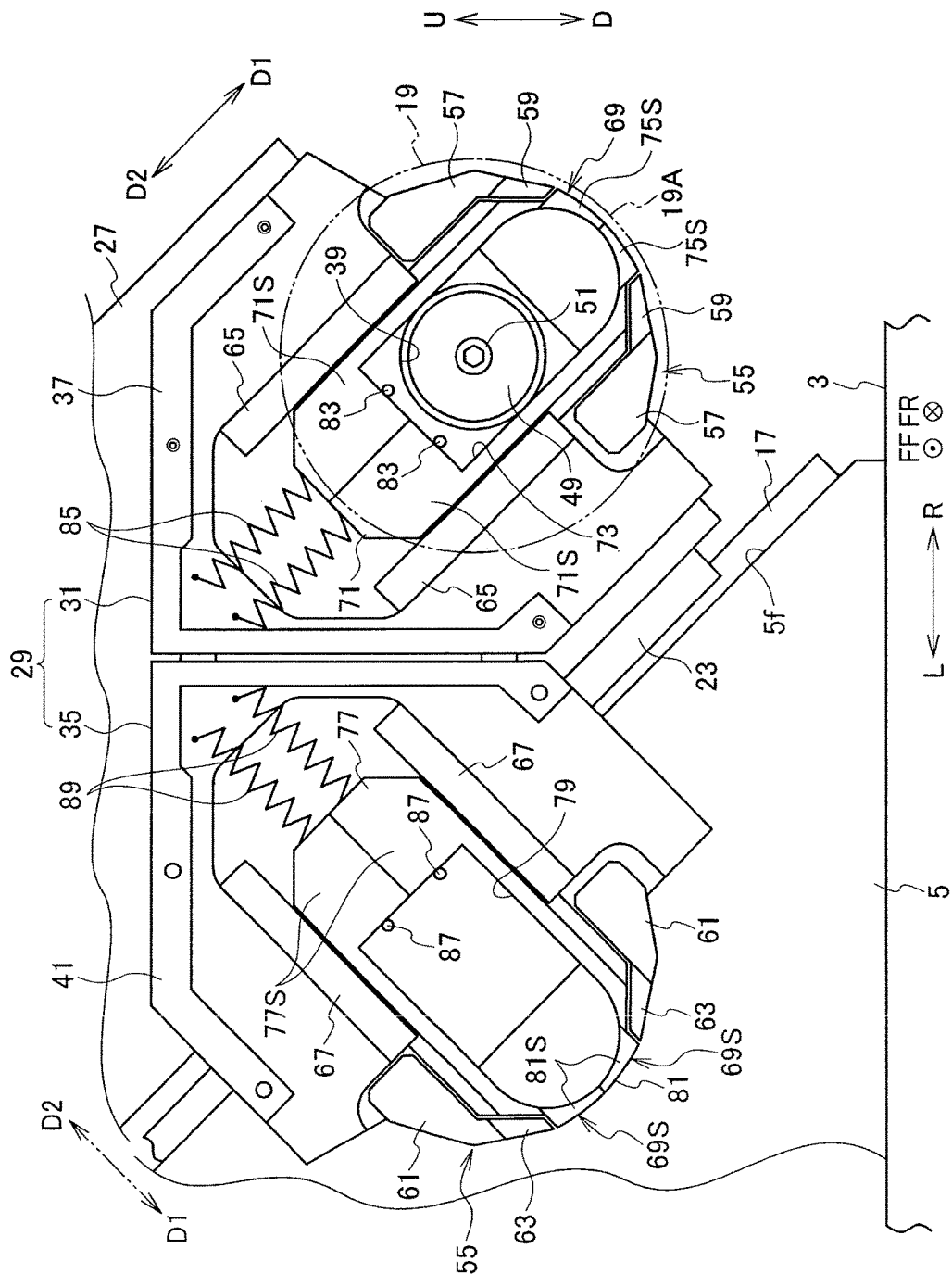
FIG. 8 is a diagram showing a main portion of a second modified example of an embodiment of the present invention, which is showing a state where a front side of a casing body is opened by a casing rid.

As shown in FIG. 8 and FIG. 9(a), in the second modified example of the embodiment of the present invention, the movable saw blade guide set 69 is divided in a direction orthogonal to the cutting direction D1. In other words, the movable saw blade guide set 69 is configured from a pair of divided saw blade guide sets 69S that are divided in said orthogonal direction.

More specifically, the first movable plate 71 is configured from a pair of divided movable plates 71S that are divided in said orthogonal direction. The first movable insert 75 is configured from a pair of divided movable inserts 75S that are divided in said orthogonal direction. Also, the second movable plate 77 is configured from a pair of divided movable plates 77S that are divided in said orthogonal direction. The second movable insert 81 is configured from a pair of divided movable inserts 81S that are divided in said orthogonal direction.

A movement in the cutting direction D1 of each divided movable plate 71S is regulated by the first stopper 83 provided at an appropriate position on the inner side surface of the casing body 31. Each divided movable plate 71S is biased in the cutting direction D1 (to the first stopper 83 side) by the first spring 85 provided on an upper portion of the inner side surface of the casing body 31. Also, a movement in the cutting direction D1 of each divided movable plate 77S is regulated by the second stopper 87 provided at an appropriate position on the inner side surface of the casing rid 35. Each divided movable plate 77S is biased in the cutting direction D1 (to the second stopper 87 side) by the second spring 89 provided on an upper portion of the inner side surface of the casing rid 35.

As shown in FIG. 9(a), in the second modified example of the embodiment of the present invention, until a start of the cutting into the workpiece W by the circular saw blade 19, the movable saw blade guide set 69 guides to pinch the body part 19b of the circular saw blade 19 on a diameter direction inner side of the cutting region 19A in the circular saw blade 19. By this, it is possible to suppress a runout of the circular saw blade 19 when the circular saw blade 19 is plunging into the workpiece W.

As shown in FIG. 9(b), in the case where a width of the workpiece W is small, as the cutting into the workpiece by the circular saw blade 19 progresses, only one of the divided saw blade guide set 69S moves relatively with respect to the processing head 21 in the opposite direction D2 against the biasing force of the springs 85 and 89. At this point, another one of the divided saw blade guide set 69S is guiding to pinch the body part of the circular saw blade 19 on a diameter direction inner side of the cutting region 19A in the circular saw blade 19.

Then, in the second modified example of the embodiment of the present invention, it is possible to further improve the effect of the embodiment of the present invention as described above.

Note that the present invention is not to be limited to the description of the embodiments described above, and can be practiced in various embodiments as follows. For example, instead of setting the cutting direction D1 of the processing head 21 to be a direction inclined with respect to a horizontal direction, it may be set as a horizontal direction or a vertical direction (perpendicular direction). The fixed saw blade guide sets 55 may be omitted from the configuration of the circular saw machine. Then, the scope of the rights encompassed by the present invention is not to be limited to the embodiments described above.

The invention claimed is:
1. A circular saw machine, comprising:
a processing head capable of moving in a cutting direction for imparting a cut to a workpiece and an opposite direction opposite the cutting direction, the processing head having a main shaft capable of rotating and a circular saw blade fixed to the main shaft, the processing head having a saw blade casing for housing the circular saw blade, and the processing head having a plurality of slide guides extending in the cutting direction;
a plurality of guide rails extending in the cutting direction, the plurality of guide rails configured to guide the processing head in the cutting direction and the opposite direction;
a movable saw blade guide set that is movably provided on the processing head so as to be movable in the cutting direction and the opposite direction,
the movable saw blade guide set comprising:
a first movable insert provided within the saw blade casing and arranged in a diameter direction inner side of a cutting region in which a cutting effect is effectuated in the circular saw blade, and the first movable insert being capable of contacting a back surface of a body part of the circular saw blade, and
a second movable insert provided within the saw blade casing and arranged in the diameter direction inner side of the cutting region in the circular saw blade, and the second movable insert being capable of contacting a front surface of the body part of the circular saw blade,
wherein, until a start of the cutting into the workpiece, the movable saw blade guide set guides to pinch the body part of the circular saw blade on the diameter direction inner side of the cutting region in the circular saw by the first movable insert and the second movable insert,
wherein, as cutting into the workpiece progresses, the movable saw blade guide set is configured to move relative to the processing head in the opposite direction, thereby allowing the first movable insert and the second movable insert to approach the main shaft in coordination with a movement in the cutting direction of the processing head;

and wherein the movable saw blade guide set is configured to be movable in the cutting direction and the opposite direction via the plurality of slide guides, and wherein the movable saw blade guide set moves relative to the processing head, in the opposite direction, in coordination with the movement in the cutting direction of the processing head.

2. The circular saw machine as described in claim 1, further comprising:

a stopper for regulating a movement in the cutting direction of the movable saw blade guide set with respect to the processing head; and a biasing member for biasing the movable saw blade guide set into the cutting direction, wherein, as cutting into the workpiece progresses, the movable saw blade guide set is configured to be maintained in abutment with the workpiece and move against the biasing force of the biasing member.

3. The circular saw machine as described in claim 1, further comprising an actuator for moving the movable saw blade guide set relatively with respect to the processing head in the cutting direction and the opposite direction.

4. The circular saw machine as described in claim 1, wherein:

the saw blade casing has a casing body, and a casing cover provided on the casing body and capable of opening or closing a front side of the casing body;

the first movable insert is provided to be movable in the cutting direction and the opposite direction on an inner surface of the casing body; and the second movable insert is provided to be movable in the cutting direction and the opposite direction on an inner surface of the casing cover.

* * * * *